US009128864B2

(12) United States Patent
Torii et al.

(10) Patent No.: US 9,128,864 B2
(45) Date of Patent: Sep. 8, 2015

(54) MEMORY CONTROLLER, STORAGE DEVICE AND ERROR CORRECTION METHOD

(71) Applicants: Osamu Torii, Tokyo (JP); Shinichi Kanno, Tokyo (JP)

(72) Inventors: Osamu Torii, Tokyo (JP); Shinichi Kanno, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 213 days.

(21) Appl. No.: 13/724,337

(22) Filed: Dec. 21, 2012

(65) Prior Publication Data

US 2013/0305120 A1    Nov. 14, 2013

Related U.S. Application Data

(60) Provisional application No. 61/646,490, filed on May 14, 2012.

(51) Int. Cl.
*H03M 13/00* (2006.01)
*G06F 11/10* (2006.01)

(52) U.S. Cl.
CPC ........ *G06F 11/1008* (2013.01); *G06F 11/1044* (2013.01)

(58) Field of Classification Search
CPC ............ G06F 11/1008; G06F 11/1012; G06F 11/1068; G06F 11/10; H03M 13/29; H03M 13/6575; H03M 13/2942; H03M 13/19; H03M 13/1111; H03M 13/152; H03M 13/1545; H03M 13/6362; H03M 13/2906; H03M 13/2927; H03M 13/3715; H03M 13/2903; G11C 2029/0411
See application file for complete search history.

(56) References Cited

U.S. PATENT DOCUMENTS

| | | | |
|---|---|---|---|
| 4,525,838 A | 6/1985 | Patel | |
| 7,418,644 B2 | 8/2008 | Smith et al. | |
| 7,844,877 B2 | 11/2010 | Litsyn et al. | |
| 8,055,977 B2 | 11/2011 | Ito | |
| 8,086,931 B2 | 12/2011 | Litsyn et al. | |
| 8,555,139 B1 * | 10/2013 | Yang et al. | 714/758 |

(Continued)

FOREIGN PATENT DOCUMENTS

| | | |
|---|---|---|
| JP | 59-165541 | 9/1984 |
| JP | 60-120623 | 6/1985 |

(Continued)

OTHER PUBLICATIONS

U.S. Appl. No. 13/762,820, filed Feb. 8, 2013, Hara et al.

(Continued)

*Primary Examiner* — Guerrier Merant
(74) *Attorney, Agent, or Firm* — Oblon, McClelland, Maier & Neustadt, L.L.P.

(57) ABSTRACT

According to one embodiment, a memory controller includes an encoding unit that generates a first parity for every user data and a second parity for two or more user data and the corresponding first parity, a memory interface unit that the non-volatile memory to write and read the user data and the parities to and from the non-volatile memory, and a decoding unit that performs an error correction decoding process using the user data, and the parities. The error correction decoding processing that uses both the first parity and the second parity has at least A (a correcting capability of the first parity)+B (a correcting capability of the second parity) bits of correcting capability for the first user data and its first and second parities and for the second user data and its first and second parities.

12 Claims, 7 Drawing Sheets

(56) References Cited

U.S. PATENT DOCUMENTS

| | | | |
|---|---|---|---|
| 8,645,789 B2* | 2/2014 | Sharon et al. | 714/755 |
| 2007/0250753 A1* | 10/2007 | Bresalier et al. | 714/755 |
| 2011/0276856 A1 | 11/2011 | Litsyn et al. | |
| 2011/0289385 A1* | 11/2011 | Takeuchi et al. | 714/764 |
| 2012/0260147 A1* | 10/2012 | Perlmutter et al. | 714/763 |
| 2013/0166988 A1* | 6/2013 | Sharon et al. | 714/758 |
| 2013/0246887 A1 | 9/2013 | Torii et al. | |

FOREIGN PATENT DOCUMENTS

| | | |
|---|---|---|
| JP | 2005-56397 | 3/2005 |
| JP | 2008-136173 | 6/2008 |
| JP | 2009-211209 | 9/2009 |
| JP | 2010-509790 | 3/2010 |
| JP | 2013-225830 A | 10/2013 |

OTHER PUBLICATIONS

U.S. Appl. No. 14/193,166, filed Feb. 28, 2014, Kokubun, et al.
Office Action issued Dec. 18, 2014 in Taiwanese Patent Application No. 101132387 (with English Translation).

* cited by examiner

MEMORY CONTROLLER, STORAGE DEVICE AND ERROR CORRECTION METHOD

CROSS-REFERENCE TO RELATED APPLICATIONS

This application is based upon and claims the benefit of priority from Provisional Patent Application No. 61/646,490, filed on May 14, 2012; the entire contents of which are incorporated herein by reference.

FIELD

Embodiments described herein relate generally to a memory controller, a memory device, and an error correcting method.

BACKGROUND

When user data stored in a memory is read out from the memory, there is a case where the user data is changed into a different value from an original value or if data transmitted from a transmitting device is received in a receiving device, there is a case where the received data is changed into a value different from the original value.

In order to address to the above problems, a method that the user data is error-correction encoded to generate parity data and the user data and the parity are managed as a pair is generally suggested. As the error correction code, for example, a BCH code or a RS (Reed-Solomon) code is used.

DETAILED DESCRIPTION

In general, according to one embodiment, a memory controller that controls a non-volatile memory includes an encoding unit that performs a first error correction encoding process using the same generator polynomial for first user data and for second user data to generate a first parity for each user data, and perform a second error correction encoding process to generate second parity for the first user data and its first parity and for second user data and its first parity. The memory controller further includes a memory interface unit controls the non-volatile memory to write and read the user data and the parities to and from the non-volatile memory; and a decoding unit that performs an error correction decoding process using the user data and the parities. If a correcting capability of the first parity is A (A is an integer of 1 or larger) bits and a correcting capability of the second parity is B (B is an integer of 1 or larger) bits, the error correction decoding processing that uses both the first parity and the second parity has at least A+B bits of correcting capability for the first user data and its first and second parities and for the second user data and its first and second parities.

Exemplary embodiments of a memory controller, a memory device, and an error correcting method will be explained below in detail with reference to the accompanying drawings. The present invention is not limited to the following embodiments.

First Embodiment

Figure 1:
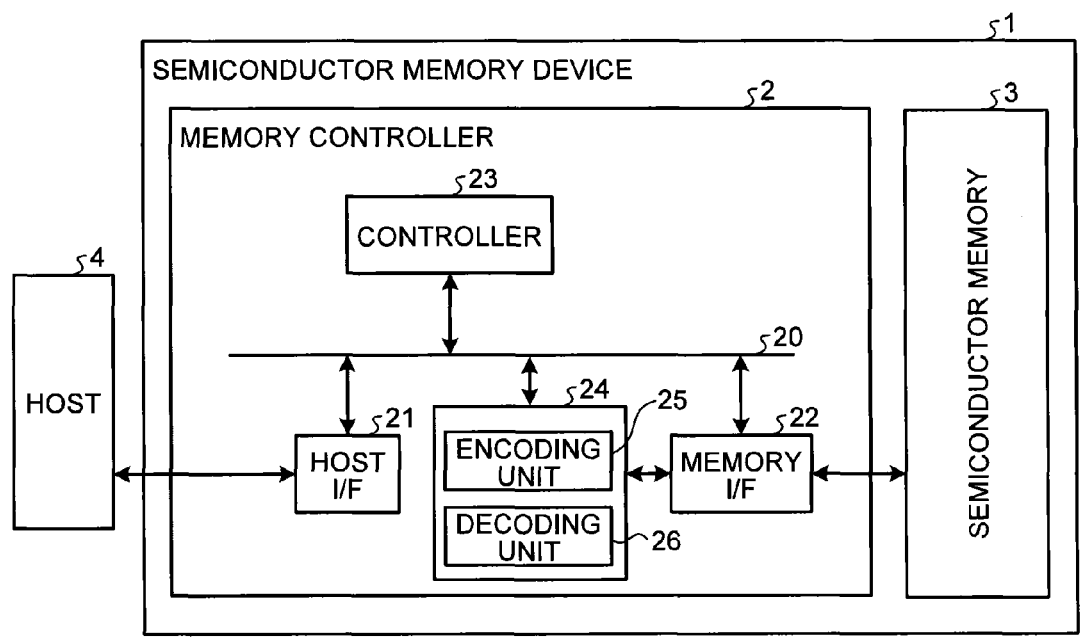
FIG. 1 is a block diagram illustrating a configuration example of a semiconductor memory device according to a first embodiment.

FIG. 1 is a block diagram illustrating a configuration example of a semiconductor memory device (memory device) according to a first embodiment. The semiconductor memory device 1 according to the embodiment includes a memory controller 2 and a semiconductor memory (non-volatile memory) 3. The memory device 1 may be connected to a host 4 and FIG. 1 illustrates a status that the memory device 1 is connected to the host 4. The host 4, for example, is electronic equipment such as a personal computer or a portable terminal.

The semiconductor memory 3 is a non-volatile memory that volatily stores data, for example, a NAND memory. Here, even though an example that uses the NAND memory as the semiconductor memory 3 is described, a storing unit other than the NAND memory as the semiconductor memory 3 may be used. In the NAND memory, there is a writing unit (minimum writing unit) which is generally referred to as a 'page' and the writing is performed in the page unit.

The memory controller 2 controls the writing into the semiconductor memory 3 in accordance with a writing command (request) from the host 4 and controls the reading out from the NAND memory 3 in accordance with a reading command (request) from the host 4. The memory controller 2 includes a host I/F 21, a memory I/F 22, a controller 23, and an encoding/decoding unit 24. The encoding/decoding unit 24 includes an encoding unit 25 and a decoding unit 26. The host I/F 21, the memory I/F 22, the controller 23, and the encoding unit 25, and the decoding unit 26 are connected by an internal bus 20.

The host I/F 21 performs a processing based on an interface standard between the host I/F 21 and the host 4 and outputs the command or user data received from the host 4 to the internal bus 20. Further, the host I/F 21 transmits the user data read out from the semiconductor memory 3 or response from the controller 23 and the like to the host 4.

The memory I/F 22 controls a processing of writing the writing data in the semiconductor memory 3 and a processing of reading data from the semiconductor memory 3 based on the instruction of the controller 23.

The controller 23 is a controller that controls components of the semiconductor memory device 1 as a whole. When the controller 23 receives a command from the host 4 via the host I/F 21, the controller 23 controls the components in accordance with the command. For example, the controller 23 instructs the memory I/F 22 to write the user data and the parity into the semiconductor memory 3 and read out the user data and the parity from the semiconductor memory 3 in accordance with the command from the host 4.

The encoding unit 25 performs an error correction encoding processing and generates a parity based on data transmitted to the internal bus 20. Any codes may be used as an error correcting code, and for example, a BCH code or an RS (Reed-Solomon) code may be used. Hereinafter, even though an example that uses the BCH code will be described, a kind of an error correcting code is not limited thereto, but a code that can be divided into information data and a parity after being encoded is preferable.

The decoding unit 26 performs a decoding processing based on the user data and the parity read out from the semiconductor memory 3. If there is no error in the user data, the user data read out from the semiconductor memory 3 is output to the internal bus 20 as it is. In contrast, if there is an error in the user data, the error is corrected using the parity and then the user data is output to the internal bus 20.

When the user data stored in the semiconductor memory 3 is protected by performing the error correction encoding, the error probability may vary due to different reliability corresponding to the user data. When the user data having a low reliability is protected, a parity having a high error correcting capability is desirably generated. However, the parity having a high error correcting capability becomes larger in size. With respect to the user data having a high reliability, the parity having a high error correcting capability is not required. If a parity having a high error correcting capability is generated for all of the user data in accordance with the user data having a low reliability, the amount of data of the parity that is stored in the semiconductor memory 3 is increased. Further, also in the user data having a low reliability, actually, in most cases, there is no error or the number of errors is smaller than a maximum estimated number. Therefore, it is possible to sufficiently cope with the problems with the error correcting capability corresponding to the user data having a high reliability.

In the embodiment, as the error correcting code, a code that is capable of encoding step by step with a high error correcting capability by adding parities corresponding to increase of the error correcting capability is used. First, a first step of error correction encoding processing is performed to generate parities for every user data with a predetermined size and then, as second parity, parity corresponding to a plurality of user data and a plurality of first parities corresponding to the user data. Then, a parity corresponding to the second parity is generated. As described above, in the embodiment, the number of user data which are encoding targets is varied for every step (one in the first step and plural in the second step).

By generating the second parity based on the plurality of user data and the plurality of first parities corresponding to the user data, if there is a difference in the number of errors between the user data, the second parity may be adaptively used for the user data having a lower reliability. For example, it is assumed that if the first parities are generated so as to have a constant error correction capability, a user data #1 has more errors than a user data #2, the user data #2 can be corrected by the first parity and the user data #1 cannot be corrected by the first parity. In this case, if the error correcting capability when the first parity and the second parity are combined to be used is more than the number of errors in the user data #1 and the first parity, the error of the user data #1 can be also corrected by performing the error correction processing using the first parity and the second parity whose error is corrected. Similarly, if the user data #2 has more errors, the error of the user data #2 can be corrected using the first parity and the second parity whose error is corrected. As described above, in the embodiment, more parities can be dynamically allocated to the user data having more errors. Specifically, when the difference in the reliability between the user data (difference in the number of estimated errors) may be unknown or varied, it is possible to improve the error correcting capability while preventing the amount of data of the parities from being increased. Further, even when it fails to correct the error of the user data #1 and the error of the user data #2 in the first error correcting step, by performing the error correction processing using the first parity and the second parity, the errors may be corrected.

As a method of generating the parity through multiple steps, a method of performing an independent encoding processing step by step is considered. For example, as a first step, a parity A having a predetermined error correcting capability is generated for user data. As a second step, it is considered that a parity B having a higher error correcting capability than the predetermined error correcting capability is generated based on the user data by another encoding processing. However, in this case, since the parity B is generated independently from the parity A, the parity A may not be used for decoding that uses the parity B. In contrast, if the code to which the parities enough to increase the error correcting capability are added as described in the embodiment is used, when the decoding is performed by using the second parity, the first parity may be also used. Therefore, if the total parity sizes are the same, the code to which the parities enough to increase the error correcting capability are added has a higher error correcting capability than that in the encoding at the independent multiple steps. Further, if the error correcting capabilities are the same, the code to which the parities enough to increase the error correcting capability are added has a smaller parity size.

For example, when the parities are generated in two steps, if a correcting capability of a first parity is A (A is an integer of 1 or larger) bits and a correcting capability of a second parity is B (B is an integer of 1 or larger) bits, in the embodiment, by using both the first parity and the second parity, a correcting capability of A+B bits or larger is obtained for the first parity, the user data which is a protecting target for the parity, and the second parity. Further, as described above, if a parity of the second parity (external parity which will be described below) is generated and the second parity where an error is corrected using the external parity at the time of decoding is used, an error is not included in the second parity. Therefore, a correcting capability of A+B bits is obtained for the first parity and the user and the first parity data which are the protecting target for the parity.

Hereinafter, in the embodiment, even though a method of generating parities in two steps will be mainly described, a similar error correction processing and a decoding processing will be performed in three or more steps. When the parities are generated in n steps (n is an integer of 2 or larger), in the embodiment, the size of i-th (i is an integer of 2 or larger and of n or smaller) parity is smaller than the size of a parity that is independently generated so as to have the same error correcting capability as when the error is corrected using all the first to i-th parities.

Figure 2:
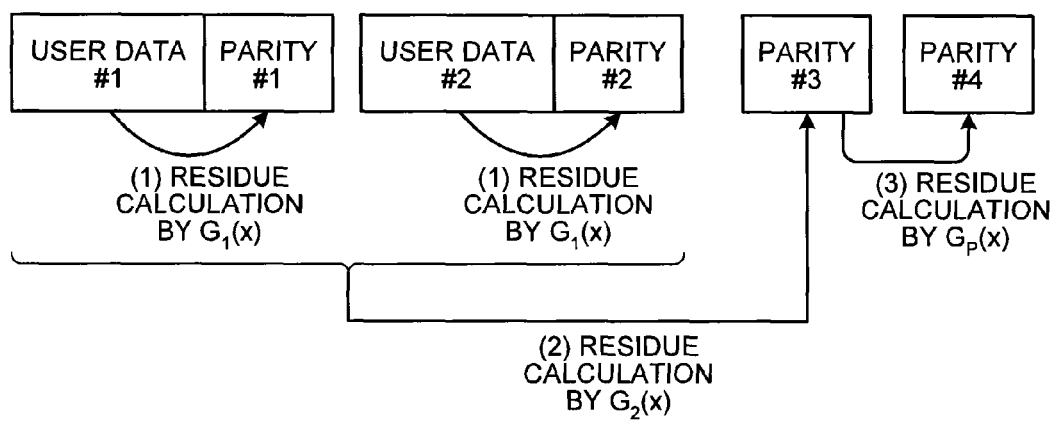
FIG. 2 is a diagram illustrating a concept of an encoding operation according to the first embodiment.

Hereinafter, an error correction encoding processing (hereinafter, simply referred to as an encoding operation) according to the embodiment and a decoding operation will be described. FIG. 2 is a diagram illustrating a concept of an encoding operation according to the embodiment. FIG. 2 illustrates an example of calculating parities in two steps. The encoding unit 25 of the embodiment calculates a parity in two steps as follows as the encoding operation and further calculates a parity of the second parity (external parity).

(1) A parity #1 which is a first parity is calculated by $G_1(x)$ using user data #1 and a parity #2 which is the first parity is calculated by $G_1(x)$ using user data #2.

(2) A parity #3 which is a second parity is calculated by a generator polynomial $G_2(x)$ using the user data #1+the parity #1+the user data #2+the parity #2.

(3) A parity #4 is calculated by $G_p(x)$ using the parity #3.

Further, $G_i(x)$ (i=0, 1, and 2) is a generator polynomial and will be described below.

In FIG. 2, the number of user data that calculates the first parity, that is, the number of user data which is a protecting target of the second parity is set to 2. However, the number of the user data which is a protecting target of the second parity may be 3 or more. If the number of user data which is a protecting target of the second parity is m (m is an integer of 2 or larger), in (1), parities are calculated with respect to m user data and in (2), the second parity may be calculated by the generator polynomial $G_2(x)$ using the user data #1+the parity #1+ . . . +user data #m+parity #m.

Here, a parity which is not a parity generated in multiple steps described in the embodiment and is generated by a generator polynomial $G_p(x)$ selected regardless of $G_1(x)$, $G_2(x)$, . . . is referred to as an external parity.

Figure 3:
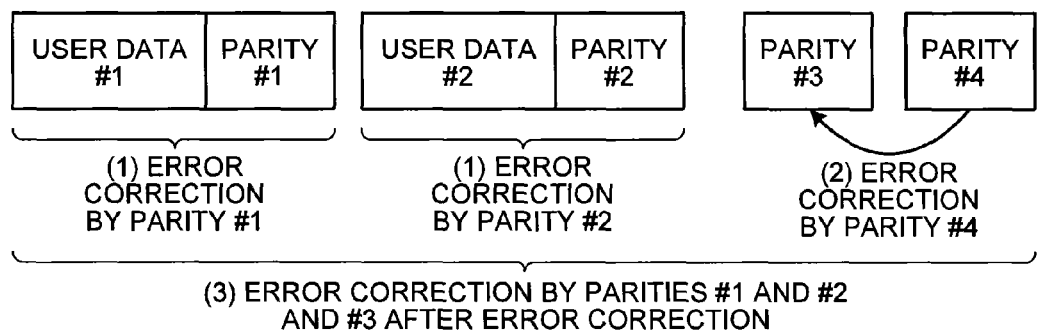
FIG. 3 is a diagram illustrating a concept of a decoding operation according to the first embodiment.

FIG. 3 is a diagram illustrating a concept of a decoding operation according to the first embodiment. In FIG. 3, a procedure of the decoding operation when the encoding operation illustrated in FIG. 2 is performed is illustrated. The decoding unit 26 of the embodiment performs the following error correction as the decoding operation.

(1) An error of the user data #1+the parity #1 is corrected using the parity #1 and an error of the user data #2+the parity #2 is corrected using the parity #2.

(2) When the error correction of (1) fails, an error of the parity #3 is corrected using the parity #4.

(3) Errors of the user data #1+the parity #1+the user data #2+the parity #2 are corrected using the parities #1 and #2 and #3 of which error is corrected. Further, if a user data of any one between the user data #1 and #2 is successfully corrected by the error correction (1), in the processing (3), the user data and the parity of which errors are corrected may be used for the corresponding user data.

When each of the user data #1+parity #1, and the user #2+parity #2 is decoded using each of the parity #1, parity #2, the error correction is not performed on the user data that does not have an error, and the read user data is output as it is. Further, an error detecting code is added to the user data and then it may be determined whether there is an error of the user data using the error detecting code.

Here, a method of selecting a generator polynomial according to the embodiment will be described. Since the error correcting capability is higher in the error correction using from the parity #1 to parity #(i+1) than in the error correction using from the parity #1 to parity #i, in the embodiment, for example, the generator polynomial described below is used.

Hereinafter, an encoding operation method and a decoding operation method when a BCH code is used will be described, but it is not limited to the BCH code.

First, a general description of the BCH code will be made. User data, a parity, and a code word are rows of a value of 0 or 1. Even though there are various methods for representing them, here, they will be described using the polynomial expression. For example, the user data 10101 may be expressed as user data polynomial $x^4+x^2+1$ according to the polynomial expression.

As for the encoding operation, the four fundamental arithmetic operations that use a polynomial referred to as a generator polynomial are performed on the user data polynomial to calculate the parity polynomial which is a polynomial expression of the parity. Thereafter, the user data polynomial and the parity polynomial are combined to calculate the code polynomial.

The four fundamental arithmetic operations are performed based on: a Galois field GF (2), a Galois extension field GF ($2^m$), a primitive polynomial, and a minimal polynomial, but the detailed description thereof will be omitted.

The Galois extension field GF ($2^m$) has elements of $2^m$ kinds, which are expressed as 0, 1, $\alpha$, $\alpha^2$, $\alpha^3$, $\alpha^{M-1}$, $\alpha^M$ ($M=2^m-2$).

When a polynomial obtained from a result of adding an error to the code polynomial calculated using the generator polynomial (a result of receiving various stresses with the lapse of time) is a receiving polynomial, an error polynomial is calculated based on the receiving polynomial. In order to calculate the code polynomial using the error polynomial, it is required to appropriately select the generator polynomial.

Specifically, in order to calculate a t bits of error, the generator polynomial=0 may have 2t roots of $\alpha^r$, $\alpha^{r+1}$, $\alpha^{r+2}$, . . . , $\alpha^{2t+r-2}$, $\alpha^{2t+r-1}$ and r is an arbitrary integer (BCH limit).

Next, a method of selecting a generator polynomial in the embodiment will be described based on the description of the BCH code described above. Here, it is assumed that the error correction encoding processing is performed in n steps and the generator polynomial that is used in i-th error correction encoding processing (i=1, 2, 3, . . . , n) is $G_i(x)$. Hereinafter, when a character with a suffix ($r_1$ or $bb_1$) is used in a form of a superscript (a shoulder of an exponent) or a suffix (subscript), even though the character with a suffix is written without using the superscript or the subscript (r1 or bb1), both indicates the same thing.

In this case, n generator polynomials $G_1(x)$, $G_2(x)$, . . . , $G_n(x)$ are selected so as to satisfy n kinds of conditions as follows:

(1) $r_1$ is an integer and $G_1(x)$=0 has $2t_1$ (=$2 \times t_1$) roots of $\alpha^{r1}$, $\alpha^{r1+1}$, $\alpha^{r1+2}$, . . . , $\alpha^{2t1+r1-2}$, $\alpha^{2t1+r1-1}$, (2) $r_2$ is an integer and $G_1(x)*G_2(x)$=0 has $2t_2$ roots of $\alpha^{r2}$, $\alpha^{r2+1}$, $\alpha^{r2+2}$, . . . , $\alpha^{2t2+r2-2}$, $\alpha^{2t2+r2-1}$,

. . .

(n) $r_n$ is an integer and $G_1(x)*G_2(x) \ldots *G_n(x)$=0 has $2t_n$ roots of $\alpha^{rn}$, $\alpha^{rn+1}$, $\alpha^{rn+2}$, . . . , $\alpha^{2tn+rn-2}$, $\alpha^{2tn+rn-1}$. Further, $r_1$, $r_2$, . . . $r_n$ satisfy the following relationship.

$$r_2 \leq r_1, r_1+2t-1 \leq r_2+2t_2-1$$

$$r_3 \leq r_2, r_2+2t_2-1 \leq r_3+2t_3-1$$

$$r_n \leq r_{n-1}, r_{n-1}+2t_{n-1}-1 \leq r_n+2t_n-1$$

Therefore, $t_n > t_{n-1} > \ldots > t_2 > t_1$ is established.

If the above-mentioned generator polynomials are selected, when $t_0$=0, $b_i=t_i-t_{i-1}$ ($1 \leq i \leq n$), the i-th parity which is calculated by $G_i(x)$ has bi bits of correcting capability.

If the above-mentioned generator polynomials are selected and first to i-th parities are used for one user data, when an error up to $t_i$ bits is present in user data+first parity+second parity+ . . . +i-th parity, the error in the user data is corrected and the user data may have a value that should be originally taken.

Therefore, if the above-mentioned generator polynomials are selected and first to n-th parities are used, when an error up to $t_n$ bits is present in user data+first parity+second parity+ . . . +n-th parity, the error in the user data is corrected and the user data may have a value that should be originally taken.

As an example of the generator polynomial selected so as to satisfy the n−1 kinds of conditions, an example of $r_1=r_2=\ldots=r_n=1$ will be described. It is assumed that a minimal polynomial on GF(2) having $\alpha^i$ as a root is $M_i(x)$. With respect to an arbitrary integer $bb_1$, $bb_2$, $bb_3$, ..., $bb_n$ that satisfy $0<bb_1<bb_2<bb_3<\ldots<bb_n$, $GG_i(x)$ is defined as following Equation (1).

$$GG_i(x)=M_1(x)*M_3(x)*M_5(x)*\ldots*M_{2bbi-1}(x) \quad (1\le i\le n) \qquad (1)$$

In this case, the BCH code that has $GG_1(x)$ as the generator polynomial may correct an error up to $bb_i$ bits.

When $G_i(x)$ is defined as following Equation (2), $$G_0(x) = 1, \qquad (2)$$
$$G_i(x) = GG_i(x)/GG_{i-1}(x)$$
$$= M_{2bb(i-1)+1}(x)*M_{2bb(i-1)+3}(x)*\ldots*M_{2bbi-1} \quad (1\le i\le n)$$

Further, $bb(i-1)=bb_{i-1}$ is assumed.

The generator polynomial represented by Equation (2) is an example of the generator polynomial selected so as to satisfy the above-mentioned n−1 kinds of conditions and corresponds to an example of $bi=bb_i-bb_{i-1}$ and $t_i=bb_i$, among the n−1 kinds of conditions.

Figure 4:
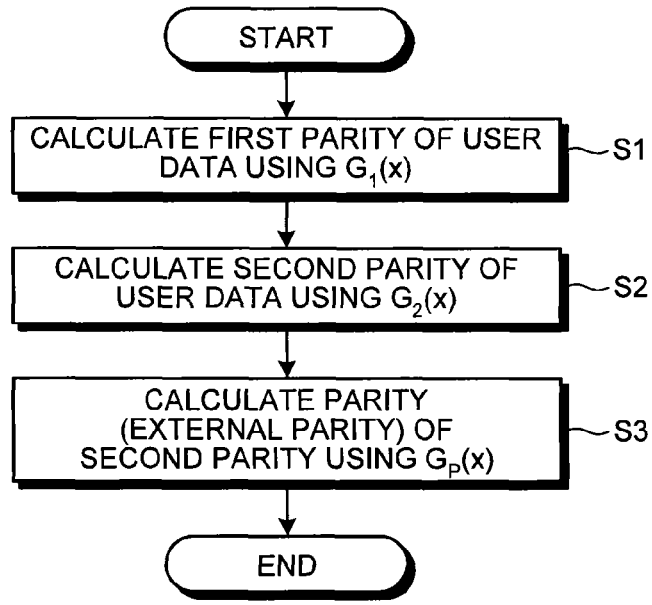
FIG. 4 is a flowchart illustrating an example of an encoding operation procedure according to the first embodiment.

FIG. 4 is a flowchart illustrating an example of an encoding operation procedure according to the embodiment. The procedure illustrated in FIG. 4, as illustrated in FIG. 2, illustrates an example of the encoding operation procedure when the parities are generated in two steps. Further, in FIG. 4, the user data #1 and #2 and parities #1 to #4 which are illustrated in FIG. 2 are treated as one encoding processing unit and the processing in one encoding processing unit will be described. First, with respect to all user data in the encoding processing unit, first parities (parities #1 and #2 in FIG. 2) are calculated for every user data using the generator polynomial $G_1(x)$ (step S1). Next, a parity (parity #3) of the user data #1+the parity #1+the user data #2+the parity #2 is calculated using the generator polynomial $G_2(x)$ (step S2). A parity (parity #4) of the parity #3 is calculated using a generator polynomial $G_p(x)$ (step S3).

The parities generated as described above are stored in the semiconductor memory 3 together with the user data. When the user data is read out from the semiconductor memory 3, the corresponding parity is also read together with the user data. In the embodiment, the storing method of the user data and the parities into the semiconductor memory 3 and the reading method of the user data and the parities from the semiconductor memory 3 are not specifically limited. However, if the first parity is used to correct an error of all user data in the corresponding encoding processing unit, the second parity and the external parity do not need to be read out. Therefore, first, the first parity for the user data is read out, and if the error is not able to be corrected by the first parity, it may be configured that the corresponding second parity and external parity are read out.

Figure 5:
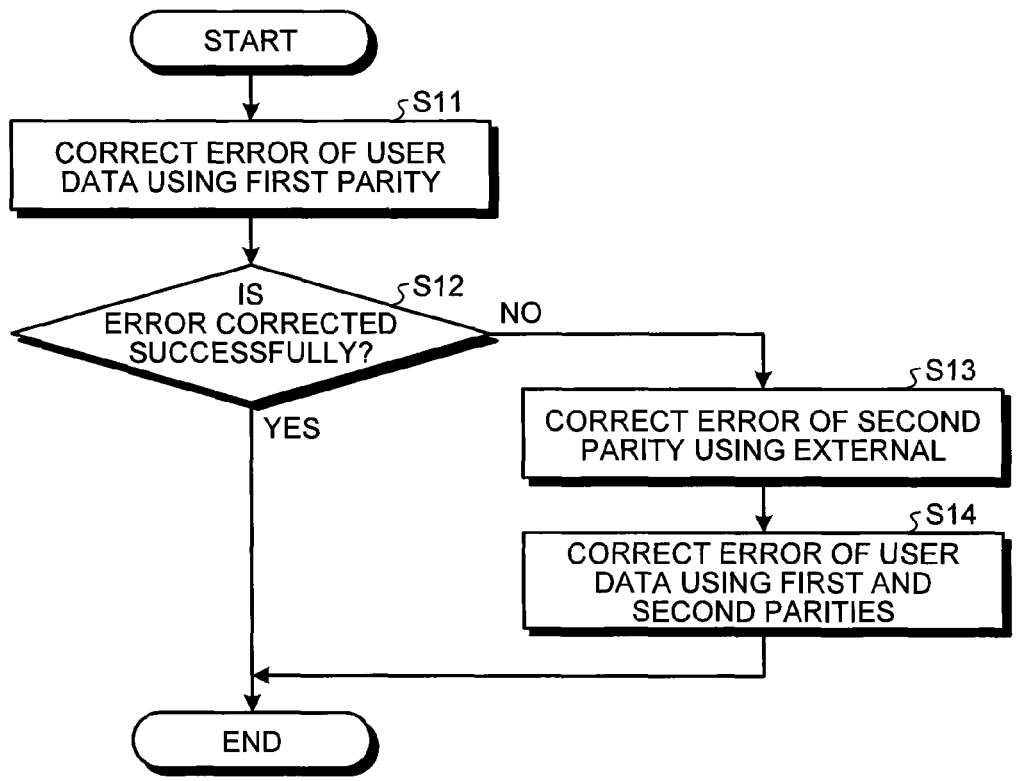
FIG. 5 is a flowchart illustrating an example of a decoding operation procedure according to the first embodiment.

FIG. 5 is a flowchart illustrating an example of a decoding operation procedure according to the embodiment. The procedure illustrated in FIG. 5, as illustrated in FIG. 2, illustrates an example of the decoding operation procedure when the parities are generated in two steps. Further, FIG. 5 describes a processing for one encoding processing unit.

Errors of all user data in the encoding processing unit are corrected using the first parities (parities #1 and #2 of FIG. 2) (step S11). It is determined whether errors of all user data in the encoding processing unit are successfully corrected (step S12) and if the errors are successfully corrected (Yes in step S12), the processing is completed.

Here, the following two cases simply are represented that the error is successfully corrected.

There is no error so that it is needless to correct an error.

There is an error and the error is corrected by performing error correction.

In the encoding processing unit, if there is at least one of user data of which error is not successfully corrected (No in step S12), an error of the second parity is corrected using the external parity (parity #4) (step S13). Then, errors are corrected using all the first parities (parities #1 and #2 of FIG. 2) and the second parity whose error is corrected in the encoding processing unit (step S14).

In step S14, if the decoding unit 26 failed to correct the error, the decoding unit 26 notifies the controller 23 that the error correction fails. The controller 23 performs a predetermined procedure (for example, notify the host 4 that the read user data has an error) when the error correction fails. Further, even when the error correction fails in step S13, the controller 23 is notified that the error correction failed.

Even though the correcting target in the error correction of step S14 is the user data #1+the parity #1+the user data #2+the parity #2, if there is user data of which error is successfully corrected in step S11, when as the processing target of the error correction processing in step S14, the user data+the parity of which errors have been corrected are used, an actual error correction processing target is the user data which failed to correct the error+corresponding first parity. For example, in step S14, first, the error correction processing is performed using user data where the error correction using the first parity is not performed and the first parity as the processing target. If the error correction by the error correction processing fails, the error correction processing using the second parity with respect to the user data whose error is successfully corrected in step S11 may be performed using the user data+the parity after correcting as the processing target.

For example, it is assumed that the error correcting capability of the first parity is K1 bits, the number of errors in the user data #1+parity #1 is E1, and the number of errors in the user data #2 and parity #2 is E2 (E1<E2). It is further assumed that the error of the user data #1 is successfully corrected using the first parity. In this case, if it is assumed that the error correcting capability of the second parity is K2 bits, a correctable bit number using the first parity and the second parity (after correcting the error) is K1+K2 bits. If the user data #1 has been corrected and E2 is below K1+K2, the error of the user data #2 can be corrected. Further, even though both of the user data #1 and #2 fail to correct errors using the first parity, if E1+E2☐K1+K2, the errors of the user data #1 and #2 can be corrected using the first parity and the second parity.

Figure 6:
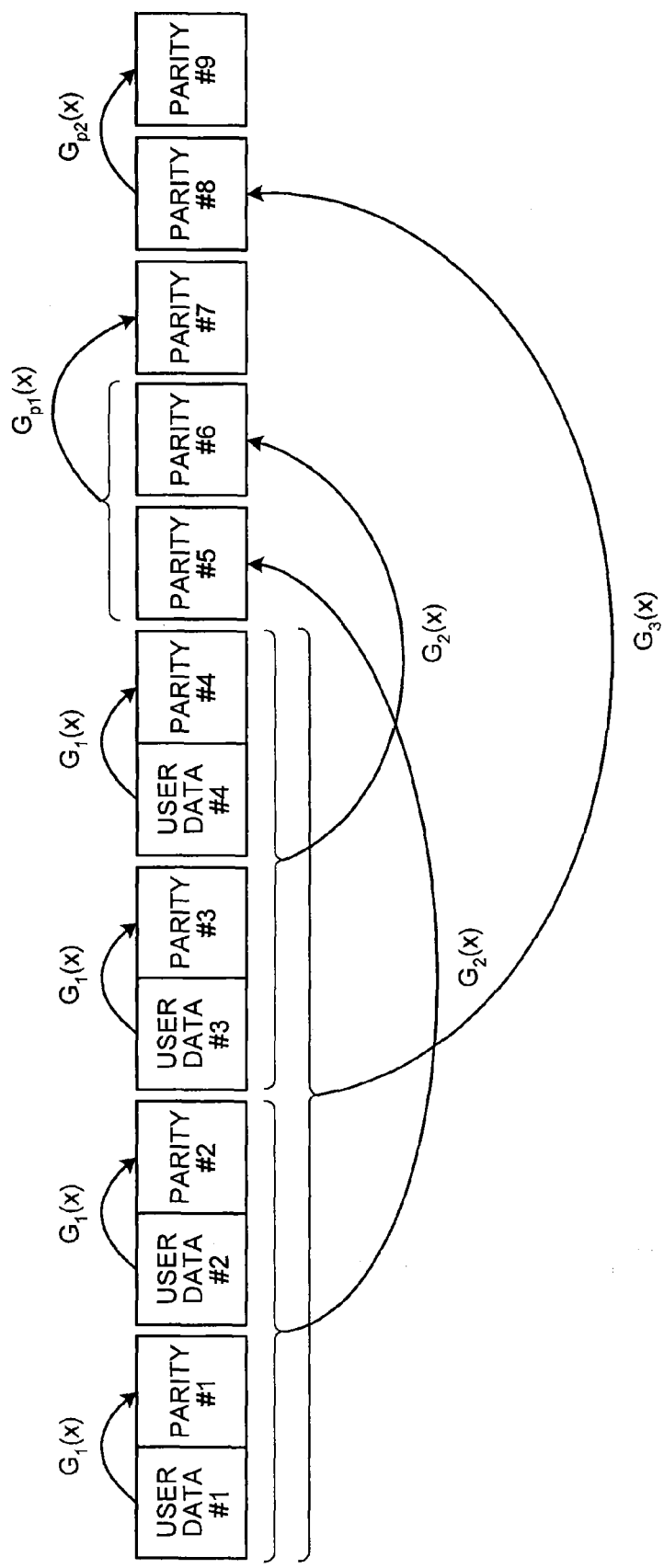
FIG. 6 is a diagram illustrating a concept of an encoding operation when a parity is generated in three steps.

In the above description, an example that generates parities in two steps is mainly described. However, the parities may be similarly generated in three or more steps. FIG. 6 is a diagram illustrating a concept of an encoding operation when parities are generated in three steps. In the example of FIG. 6, an encoding processing unit of error correction is configured by user data #1 to #4 and parities #1 to #9.

(1) A parity #1 which is the first parity is calculated by $G_1(x)$ using the user data #1, a parity #2 which is the first parity is calculated by $G_1(x)$ using the user data #2, a parity #3 which is the first parity is calculated by $G_1(x)$ using the user data #3, and a parity #4 which is the first parity is calculated by $G_1(x)$ using the user data #4.

(2) Let the user data #1+parity #1+user data #2+parity #2 be a user data group #1-1 and let the user data #3+parity

3+user data #4+parity #4 be a user data group #1-2. A parity #5 which is the second parity is calculated by the generator polynomial $G_2(x)$ using the user data group #1-1 and a parity #6 which is the second parity is calculated by the generator polynomial $G_2(x)$ using the user data group #1-2.

(3) A parity #7 is calculated by $G_{p1}(x)$ using the parities #5 and #6.

(4) A parity #8 which is a third parity is calculated by the generator polynomial $G_3(x)$ using the user data group #1-1+ user data group #1-2.

(5) A parity #9 is calculated by $G_{p2}(x)$ using the parity #8.

Further, $G_i(x)$ (i=1, 2, 3) is the above-described generator polynomial. $G_{p1}(x)$ and $G_{p2}(x)$ are generator polynomials which are selected irrelevant to Gi(x) similarly to $G_p(x)$.

In the example of FIG. 6, let the user data #1 to #4 and the parities #1 to #4 be a user data group #2-1. For example, when the parities are generated in four or more steps, a user data group #2-2 is generated similarly to the user data group #2-1 and a third parity is generated by a generator polynomial $G_3(x)$ using the user data group #2-1. A third parity is generated by the generator polynomial $G_3(x)$ using the user data group #2-2, a fourth parity is generated by a generator polynomial $G_4(x)$ using the user data group #2-1+user data group #2-2, . . . and thus the parities can be sequentially generated step by step.

Figure 7:
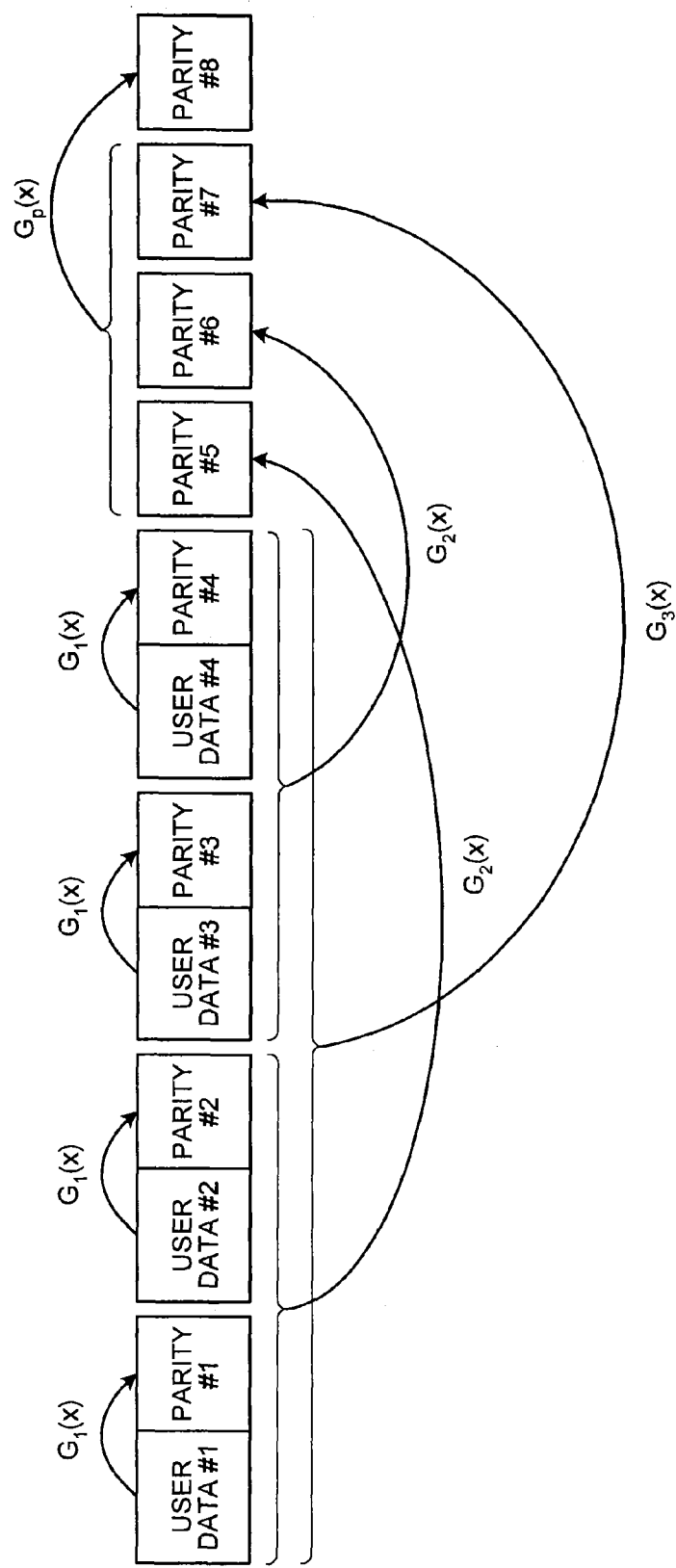
FIG. 7 is a diagram illustrating another example of an encoding operation when a parity is generated in three steps.

With respect to the external parity, as illustrated in the example of FIG. 6, the external parity may be generated for every step, or second or higher parities may be generated at once as illustrated in FIG. 7, or may be divided into several steps to be generated. Further, in the example of FIG. 6, separate external parities for the parities #5, #6, and #8 may be generated.

FIG. 7 is a diagram illustrating another example of an encoding operation when parities are generated in three steps. In the example of FIG. 7, the encoding operation is performed according to the following procedure. In the example of FIG. 7, the external parity is generated at once for second or higher parities.

(1) The parity #1 which is the first parity is calculated by $G_1(x)$ using the user data #1, the parity #2 which is the first parity is calculated by $G_1(x)$ using the user data #2, the parity #3 which is the first parity is calculated by $G_1(x)$ using the user data #3, and the parity #4 which is the first parity is calculated by $G_1(x)$ using the user data #4.

(2) Let the user data #1+parity #1+user data #2+parity #2 be a user data group #1-1 and let the user data #3+parity #3+user data #4+parity #4 be a user data group #1-2. A parity #5 which is the second parity is calculated by the generator polynomial $G_2(x)$ using the user data group #1-1 and a parity #6 which is the second parity is calculated by the generator polynomial $G_2(x)$ using the user data group #1-2.

(3) A parity #7 which is a third parity is calculated by $G_3(x)$ using the user data group #1-1+parity #5+user data group #1-2+parity #6.

(4) A parity #8 is calculated by $G_p(x)$ using the parities #5, #6, and #7.

Further, $G_i(x)$ (i=1, 2, 3) is the above-described generator polynomial.

At the time of decoding operation, the error is corrected by the following procedure.

(1) An Error of the user data #1+parity #1 is corrected using the parity #1, an error of the user data #2+parity #2 is corrected using the parity #2, an error of the user data #3+parity #3 is corrected using the parity #3, an error of the user data #4+parity #4 is corrected using the parity #4.

(2) If the error correction of (1) fails, errors of the parities #5, #6, and #7 are corrected using the parity #8. Here, if errors of all user data (user data #1 to #4) in the encoding processing unit are successfully corrected, it is called successful error correction. In contrast, if error correction for at least one of user data in the encoding processing unit fails, it is called failed error correction.

(3) Errors of the user data group #2-1 are corrected using the parities #1 and #2 and #5 after correcting an error, and errors of the user data group #2-2 are corrected using the parities #3 and #4 and #6 after correcting an error. For user data group where errors of all user data in the user data group are successfully corrected by (1), the processing of (3) may not be performed. Further, if there is user data of which error is successfully corrected by the error correction of (1) among the user data #1 to #4, in the processing of (3), the user data and the parity after correcting the error may be used for the corresponding user data.

(4) If the error correction of (3) fails, errors of the parity #7 are corrected using the parities #1 and #2 and #5, 6, 7 after correcting the errors.

If the parity is generated in four or more steps, the parity is generated as follows. Let the user data groups #1-1 and #1-2 be a first user data group and let the user data groups #2-1 and #2-2 be a second user data group. When j is an integer which is 4 or larger, let one or more (j−3)-th user data groups and a (j−1)-th parity be a (j−2)-th user data group. Then, a j-th parity is generated by performing the error correction encoding processing on the one or more (j−2)-th user data groups. The procedure is repeated for j=4 to j=k (k is an integer which is 4 or larger) to generate the fourth to (j−1)-th parities. At the time of decoding, if the error correction decoding processing that uses the user data and the first to (j−1)-th parities fails, the error correction decoding processing is performed using the user data and the first to (j−1)-th parities.

In the embodiment, an external parity for the second or higher parities is generated so that an error is not included in the second or higher parities at the time of decoding. However, the external parity for the second or higher parities may not be generated. If the external parity is not generated, with assuming that an error may be included in the second or higher parities at the time of decoding, the error correction processing is performed.

As described above, in the embodiment, as the error correction code, a code that is capable of encoding step by step with a high error correcting capability by adding parities corresponding to increase of the error correcting capability is used, the first step of the error correction encoding process is performed to generate parities for every user data with a predetermined size. Then, as a second parity, parities for a plurality of user data and a plurality of first parities corresponding to the user data are generated. Therefore, it is possible to dynamically allocate lots of parities into user data having lots of errors and improve the error correcting capability while preventing the amount of data of the parities from being increased.

Second Embodiment

Figure 8:
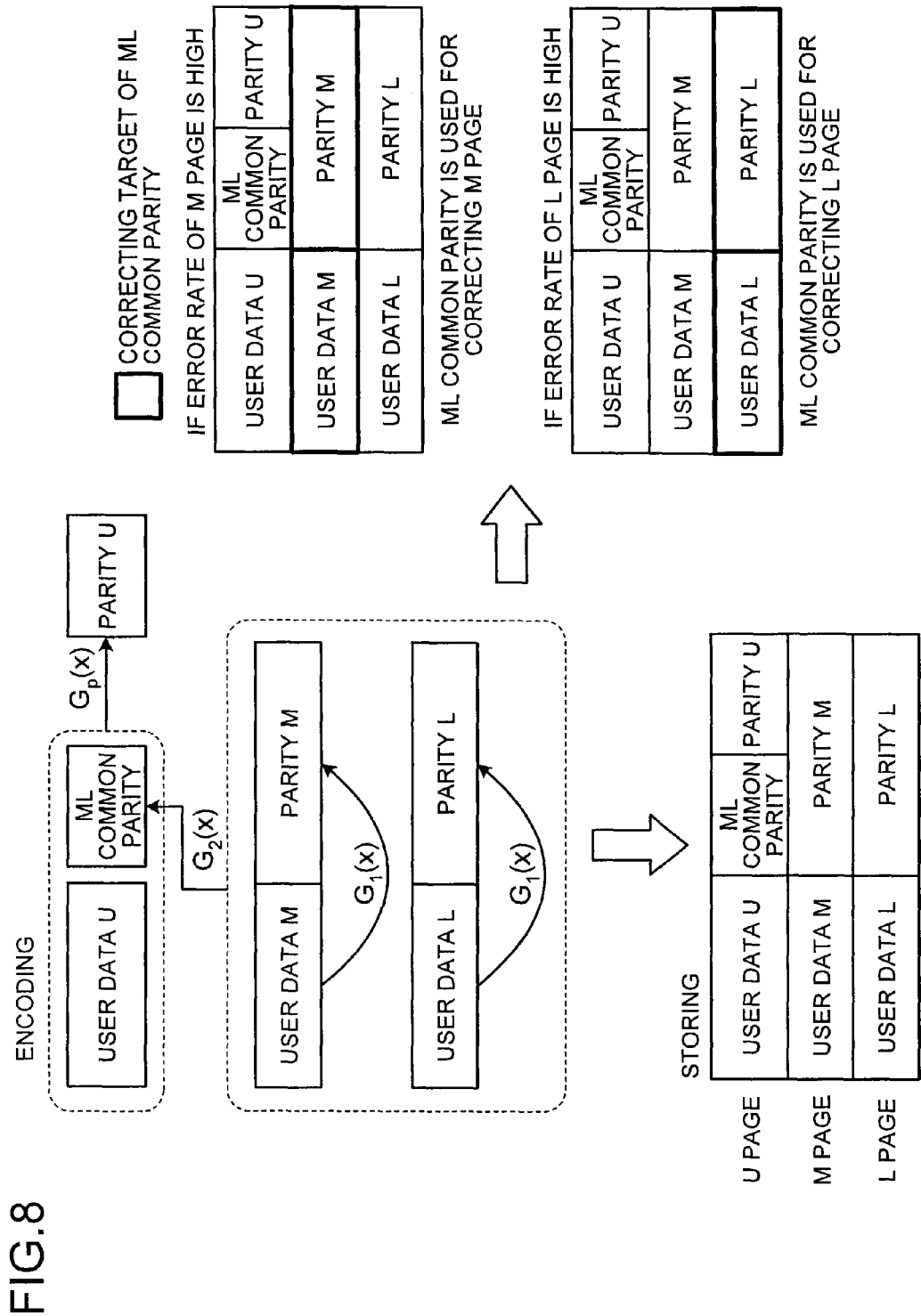
FIG. 8 is a diagram illustrating an example of an error correcting method and a parity storing method according to a second embodiment.

FIG. 8 is a diagram illustrating an example of an error correcting method and a parity storing method according to a second embodiment. The configuration of a semiconductor memory device 1 of the embodiment is the same as that of the first embodiment.

In FIG. 8, an example of a method of storing user data and parities when a semiconductor memory 3 is a NAND memory is illustrated. Here, it is assumed that 3 bits of data is stored in one memory cell, different pages are allocated into 3 bits, and the pages that are stored in one word line are referred as a lower (L) page, a middle (M) page, and an upper (U) page. However, the NAND memory that configures the semiconductor memory 3 is not limited to such type of a memory. In the example of FIG. 8, it is assumed that user data that is to be stored in the U page is user data U, user data that is to be stored in the M page is user data M, and user data that is to be stored in the L page is user data L.

In the embodiment, an encoding unit 25 performs the encoding operation according to the following procedure.

(1) A parity M which is a first parity is generated by the generator polynomial $G_1(x)$ described in the first embodiment using user data M, and a parity L which is a first parity is generated by the generator polynomial $G_1(x)$ using user data L.

(2) A ML common parity which is a second parity is generated by the generator polynomial $G_2(x)$ described in the first embodiment using the user data M+parity M+user data L+parity L.

(3) A parity U which becomes an external parity of "the user data U+ML common parity" is generated by a generator polynomial $G_p(x)$ using the user data U+ML common parity. Further, the generator polynomial $G_p(x)$ is an arbitrary generator polynomial similarly to the first embodiment.

As described above, in the embodiment, the parity U is a parity of the user data U as well as an external parity of the ML common parity which is the second parity for the user data M and the user data L.

The parities and the user data generated as described above are stored in each of the pages as illustrated in the left lower side of FIG. 8 when they are stored in the semiconductor memory 3. In other words, the user data U, the ML common parity, and the parity U are stored in the U page and the user data M and the parity M are stored in the M page, and the user data L and the parity L are stored in the L page.

Next, a decoding operation of the embodiment will be described. A decoding unit 26 of the embodiment corrects errors based on the user data and the parities read out from the semiconductor memory 3. When the user data U is read out, the errors of the user data U are corrected using the parity U. When the user data M and L are read out, the errors are corrected by the following procedure. Here, an example that a decoding operation is performed for the user data M and L will be described.

(1) An error of the user data M+parity M is corrected using the parity M and an error of the user data L+parity L is corrected using the parity L.

(2) When the error correction of (1) fails, an error of the ML common parity is corrected using the parity U.

(3) Errors of the user data M+parity M+user data L+parity L are corrected using the parities M and L and the ML common parity after correcting an error. If there is user data of which errors are successfully corrected by the error correction of (1) between the user data M and the user data L, with respect to the corresponding user data, the user data and the parities after correcting the errors are used in the processing of (3). By doing this, a correcting target of the error correction that uses the ML common parity is user data of a page in which the error correction fails (that is, a page having a high error rate) as illustrated in the right side of FIG. 8.

By the above processing, when the error rate of the M page is high, the ML common parity may be used for the M page correction. Further, when the error rate of the L page is high, the ML common parity may be used for the L page correction. As described above, since it is possible to dynamically use the second parities for the error correction of a page having lots of errors, when the error rates of the M and L pages are higher than that of the U page, for example, even when a ratio of the error rate of the M page and the error rate of the L page may be varied (or unknown), the parity may be efficiently used to achieve a high error correcting capability. Generally, the sizes of the pages are equal to each other and the sizes of user data of the pages are equal to each other. Therefore, the sizes of the parity regions (regions allocated in order to store the parities) of the pages are equal to each other. According to the embodiment, when the error rate of the U page is significantly different from the error rates of the M and L pages, the parity storing region of the page may be used as the parity storing region of the M and L pages while making the sizes of pages be equal to each other to make the size of the user data of the pages be equal to each other. Further, if there is a difference in an error rate between the pages, the parity storing region can be efficiently used in accordance with the error rate.

As described above, an example that performs the decoding operation for the user data M and L has been described. However, if the decoding operation is performed only for the user data M or only for the user data L, in (1) of the above-described decoding operation, the decoding operation for the user data which is a target of the decoding operation may be performed.

With respect to the reading order of user data and the parities from the semiconductor memory 3, for example, the reading and the decoding operation may be performed by the following procedure. When only M page, or only L page, or both M and L pages are read out, in the error correction using the first parity ((1) of the decoding operation), a page which is the reading target is read out from the semiconductor memory 3 to be the target of the decoding operation. When the error correction fails by (1) of the decoding operation, the U page is read out and the error of the ML common parity is corrected using the parity U ((2) of the decoding operation). The procedures of the reading and decoding operation are not limited to the above example. But, the first error correction of the user data M and the first error correction of the user data L may be performed at the same time.

Here, the ML common parity is stored in the U page. However, the ML common parity and the external parity may be stored in a separate page other than the U page or a separate memory device other than the semiconductor memory 3. For example, a parity exclusive page is provided and the ML common parity and the external parity may be stored in the parity exclusive page. Further, for example, when it is assumed that the error rate of the U page is not largely different from those of the M and L pages, the first parity may be generated for the U page similarly to the M and L pages, and the second parity may be generated also using the user data U+parity U as a UML common parity. For example, the UML common parity and an external parity of the UML common parity may be stored in the parity exclusive page. Operations of the embodiment other than the operation described above are the same as the first embodiment.

As described above, in the embodiment, the second parity (ML common parity) is stored in a page (U page) different from the pages (M and L pages) in which the user data which is the protecting target of the corresponding parity is stored. Therefore, the second parity can be dynamically used for error correction of a page having lots of errors. Further, when there is a difference in the error rate between pages, the parity storing region can be efficiently used in accordance with the error rate.

Third Embodiment

Figure 9:
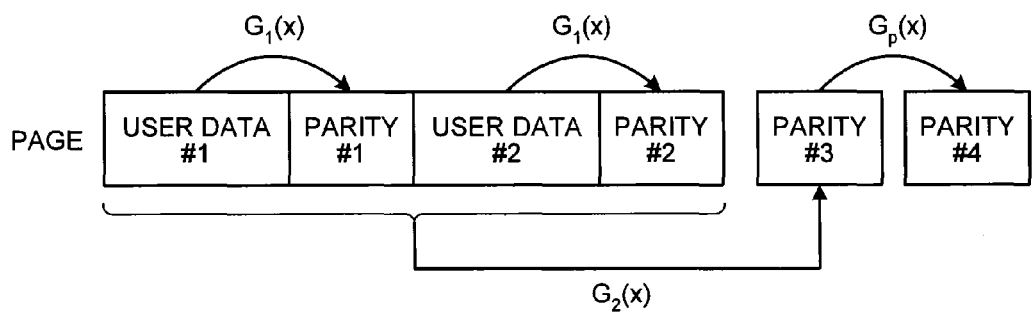
FIG. 9 is a diagram illustrating an example of an error correcting method and a parity storing method according to a third embodiment.

FIG. 9 is a diagram illustrating an example of an error correcting method and a parity storing method according to a third embodiment. The configuration of a semiconductor memory device 1 of the embodiment is the same as that of the first embodiment.

In the second embodiment, the first parity is generated in a user data unit that is stored in one page. On the contrary, in the third embodiment, the user data which is stored in one page is divided into a plurality of user data and a first parity is generated for each divided user data.

In the example of FIG. 9, the user data in the page is divided into user data #1 and user data #2. In the encoding operation, as described in the first embodiment, as first parities, parities (parity #1 and parity #2) for the user data #1 and the user data #2 are obtained by $G_1(x)$. A method of generating parities #3 and #4 is the same as that of the first embodiment. Further, the decoding operation of the embodiment is the same as that of the first embodiment.

In the embodiment, the user data in the page is divided, the first parity is generated for every divided user data, and as described in the first embodiment, a second parity (parity #3) is generated by $G_2(x)$ using the user data #1+parity #1+user data #2+parity #2. Therefore, if there is a deviation in the number of errors of the user data in the page, lots of parities may be dynamically used for the divided user data having a larger number of errors.

If the parity is assigned to the user data of one page and the error is corrected based on the parity, in many cases, the parity is assigned to every unit of power-of-two user data and the error correction is performed for every unit such a method of assigning a parity for every unit of 1024 B of user data or a method of assigning a parity for every unit of 2048 B of user data. Here, if the size of the unit is doubled, the correction capability is improved, but the cost for correcting the error (for example, a size of the correcting circuit) is also increased. Therefore, in the error correcting method of the related art, in the error correction in the unit of 1024 B, a desired correcting capability is not achieved (even though a desired cost is satisfied), and in the error correction in the unit of 2048 B, a desired cost is not satisfied (even though a desired correcting capability is achieved). As a result, it is difficult to satisfy both the correcting capability and the cost in many cases. In contrast, according to the parity assignment and a method that performs the error correction in plural units described in the embodiment, as compared with the error correcting method of the related art, the balance between the correcting capability and the correcting cost can be freely designed. Further, it is more likely to satisfy both the correcting capability and the correcting cost.

In the embodiment, the parity #3 which is the second parity and the parity #4 which is the external parity are stored in the same page as the corresponding user data. However, both the parity #3 and the parity #4 or the parity #4 may be stored in another page or another memory device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory controller that controls a non-volatile memory, comprising:

an encoding unit that calculates a first parity from a first user data by a first error correction encoding process using a first generator polynomial, calculates a second parity from a second user data by the first error correction encoding process using the first generator polynomial, and calculates a third parity from the first user data, the first parity, the second user data, and the second parity by a second error correction encoding process using a second generator polynomial;

a memory interface unit that controls the non-volatile memory to write the first user data, the first parity, the second user data, the second parity, and the third parity to the non-volatile memory; and a decoding unit that performs an error correction decoding process using the first user data, the first parity, the second user data, the second parity, and the third parity, wherein when a correcting capability of the first parity is A (A is an integer of 1 or larger) bits and a correcting capability of the third parity is B (B is an integer of 1 or larger) bits, the error correction decoding process that uses the first parity, the second parity, and the third parity has at least A+B bits of correcting capability for the first user data, the second user data, the first parity, the second parity, and the third parity.

2. The memory controller according to claim 1, wherein the decoding unit performs an error correction decoding process that uses the first parity, the second parity, and the third parity when the correction decoding process that uses only the first parity or the second parity fails.

3. The memory controller according to claim 1, wherein the first user data and second user data are stored in different pages on the non-volatile memory.

4. The memory controller according to claim 1, wherein the first user data and second user data are stored in the same page on the non-volatile memory.

5. The memory controller according to claim 1, wherein the first user data, the second user data, the first parity, the second parity, and the third parity are stored in different pages.

6. The memory controller according to claim 1, wherein the encoding unit generates an external parity by performing the error correction encoding process on the third parity, the decoding unit performs the error correction decoding process of the third parity using the external parity before performing the error correction decoding process that uses the first user data, the second user data, the first parity, the second parity, and the third parity.

7. The memory controller according to claim 1, wherein the encoding unit calculates a fourth parity from a third user data by the first error correction encoding process using the first generator polynomial, calculates a fifth parity from a fourth user data by the first error correction encoding process using the first generator polynomial, and calculates a sixth parity from the third user data, the fourth parity, the fourth user data, and the fifth parity by second error correction encoding process using the second generator polynomial, when the first user data, the second user data, the first parity, the second parity, and the third parity are considered as a first user data group, and the first user data, the third user data, the fifth user data, the fourth parity, the fifth parity, and the sixth parity are considered as a second user data group, the encoding unit performs the error correction encoding process for the first and second user data groups to generate a seventh parity, and when the error correction decoding process that uses the first user data group or the error correction decoding process that uses the second user data group, the decoding unit performs the error correction decoding process using the first and second user data groups and the seventh parity.

8. The memory controller according to claim 7, wherein when j is an integer of 4 or larger and one or more, j-th step parity is a parity calculated by j-th error correction encoding process using the j-th generator polynomial, and one or more (j−3)-th user data groups and a (j−1)-th step parity are considered as a (j−2)-th user data group, the encoding unit repeatedly generates a j-th step parity from j=4 to j=k (k is an integer of 4 or larger) by performing the error correction encoding process on one or more (j−2)-th user data groups to generate fourth to k-th step parities, and if the error correction decoding process that uses the user data and the first to (j−1)-th step parities fails, the decoding unit performs the error correction decoding process using the user data and the first to (j−1)-th step parities.

9. The memory controller according to claim 8, wherein when first to n-th (n is an integer of 2 or larger) step parities are generated and a generator polynomial $G_i(x)$ that is used to generate the i-th step parity (i is an integer that is 1 or larger and n or smaller) uses $r_i$ and $t_i$ that are integers, $r_1, r_2, \ldots r_n$ satisfy the following relationship:

$$r_2 \leq r_1, r_1 + 2t_1 - 1 \leq r_2 + 2t_2 - 1$$
$$r_3 \leq r_3, r_3 + 2t_2 - 1 \leq r_3 + 2t_3 - 1$$
$$\ldots$$
$$r_n \leq r_{n-1}, r_{n-1} + 2t_{n-1} - 1 \leq r_n + 2t_n - 1 \text{ and}$$
$$G_1(x) \times G_2(x) \times \ldots \times G_1(x) = 0 \text{ is selected so as to have } = 2 \times t_1$$
$$\text{roots of } \alpha^{ri}, \alpha^{ri+1}, \alpha^{ri+2}, \ldots, \alpha^{2ti+ri-2}, \alpha^{2ti+ri-1}.$$

10. A memory device, comprising:
a non-volatile memory;
an encoding unit that calculates a first parity from a first user data by a first error correction encoding process using a first generator polynomial, calculates a second parity from a second user data by the first error correction encoding process using the first generator polynomial, and calculates a third parity from the first user data, the first parity, the second user data, and the second parity by a second error correction encoding process using a second generator polynomial;

a memory interface unit that controls the non-volatile memory to write the first user data, the first parity, the second user data, the second parity, and the third parity to the non-volatile memory; and a decoding unit that performs an error correction decoding process using the first user data, the first parity, the second user data, the second parity, and the third parity, wherein when a correcting capability of the first parity is A (A is an integer of 1 or larger) bits and a correcting capability of the third parity is B (B is an integer of 1 or larger) bits, the error correction decoding process that uses the first parity, the second parity, and the third parity has at least A+B bits of correcting capability for the first user data, the second user data, the first parity, the second parity, and the third parity.

11. An error correcting method in a memory controller that controls a non-volatile memory, comprising:
calculating a first parity from a first user data by a first error correction encoding process using a first generator polynomial:
calculating a second parity from a second user data by the first error correction encoding process using the first generator polynomial;
calculating a third parity from the first user data, the first parity, the second user data, and the second parity by a second error correction encoding process using a second generator polynomial;
writing the first user data, the first parity, the second user data, the second parity, and the third parity to the non-volatile memory;
performing an error correction decoding process using the first user data, the first parity, the second user data, the second parity, and the third parity;
wherein when a correcting capability of the first parity is A (A is an integer of 1 or larger) bits and a correcting capability of the third parity is B (B is an integer of 1 or larger) bits, the error correction decoding process that uses the first parity, the second parity, and the third parity has at least A+B bits of correcting capability for the first user data, the second user data, the first parity, the second parity, and the third parity.

12. The memory controller according to claim 1, wherein the second generator polynomial is selected based on the first generator polynomial.

* * * * *